United States Patent
Akagunduz (10) Patent No.: US 9,135,522 B2
(45) Date of Patent: Sep. 15, 2015

(54) SYSTEM AND METHOD FOR IDENTIFYING SCALE INVARIANT FEATURES OF OBJECT OUTLINES ON IMAGES

(75) Inventor: Erdem Akagunduz, Ankara (TR)

(73) Assignee: ASELSAN ELEKTRONIK SANAYI VE TICARET ANONIM SIRKETI, Ankara (TR)

(*) Notice: Subject to any disclaimer, the term of this patent is extended or adjusted under 35 U.S.C. 154(b) by 0 days.

(21) Appl. No.: 14/240,316

(22) PCT Filed: Feb. 27, 2012

(86) PCT No.: PCT/IB2012/050883
§ 371 (c)(1),
(2), (4) Date: Feb. 21, 2014

(87) PCT Pub. No.: WO2013/128233
PCT Pub. Date: Sep. 6, 2013

(65) Prior Publication Data
US 2014/0212048 A1    Jul. 31, 2014

(51) Int. Cl.
*G06K 9/46*    (2006.01)
*G06K 9/40*    (2006.01)
*G06K 9/48*    (2006.01)
*G06K 9/62*    (2006.01)
*G06T 9/20*    (2006.01)

(52) U.S. Cl.
CPC ............... *G06K 9/48* (2013.01); *G06K 9/6201* (2013.01); *G06T 9/20* (2013.01)

(58) Field of Classification Search
None
See application file for complete search history.

(56) References Cited

U.S. PATENT DOCUMENTS

| 6,711,293 | B1 | 3/2004 | Lowe |
| 7,430,303 | B2 | 9/2008 | Sefcik et al. |
| 2005/0168460 | A1* | 8/2005 | Razdan et al. ................ 345/419 |

FOREIGN PATENT DOCUMENTS

GB    2393012    3/2004

OTHER PUBLICATIONS

International Search Report, mailing date Nov. 30, 2012 for corresponding International Application No. PCT/IB2012/050883.
Written Opinion, mailing date Nov. 30, 2012, for corresponding International Application No. PCT/IB2012/050883.

(Continued)

*Primary Examiner* — Daniel Mariam
(74) *Attorney, Agent, or Firm* — Intellectual Property Law Group LLP (57) ABSTRACT

The present invention relates to a system and method for identifying scale invariant features of image outlines. The method comprises the steps of; receiving a parametric equation of a closed planar curve; choosing nodes on the closed planar curve with equal intervals; generating a continuous scale space of the nodes on the curve; calculating circle of curvature for every node on the closed curve for every scale in every octave; finding circle of curvature differences between plurality of adjacent scales; comparing each curvature difference value and choosing the nodes with a minimum or maximum curvature difference as feature points; representing the outline with a descriptor including all the feature points. The method further comprises the steps; eliminating the feature points which are closer to each other than a predetermined threshold; and comparing a descriptor with each previously recorded descriptor belonging to various outlines, finding at least one descriptor with a good match.

20 Claims, 4 Drawing Sheets

(56) References Cited

OTHER PUBLICATIONS

Kei Kawamura et al: "Automatic Scale Detection Based on Difference of Curvature", IEICE Technical Report, Image engineering, Jan. 5, 2009, pp. 251-255.
Kawamura K et al: "Automatic Scale Detection for Contour Fragment Based on Difference of Curvature", IEICE Transactions on Information and Systems IEICE Japan, vol. E94-D, No. 10, Oct. 2011, pp. 1998-2005.
Mokhtarian F. et al: "A theory of Multiscale, Curvature-Based Shape Representation for Planar Curves", IEEE Transactions on Pattern Analysis and Machine Intelligence, IEEE Service Center, Los Alamitos, CA, US, vol. 14, No. 8, Aug. 1, 1992, pp. 789-805.
Mokhtarian F. et al: "Robust and Efficient Shape Indexing through Curvature Scale Space", Proceedings of the British Machine Vision Conference, Jan. 1, 1996, pp. 53-62.
Sanchez-Marin F.J.: "The curvature function evolved in scale-space as a representation of biological shapes", Computers in Biology and Medicine, New York, NY, US, vol. 27, No. 2, Mar. 1, 1997, pp. 77-85.

* cited by examiner

SYSTEM AND METHOD FOR IDENTIFYING SCALE INVARIANT FEATURES OF OBJECT OUTLINES ON IMAGES

CROSS-REFERENCE TO RELATED APPLICATIONS

This application is a U.S. National Phase application, under 35 U.S.C. §371, of International Application no. PCT/IB2012/050883, with an international filing date of Feb. 27, 2012, and which is hereby incorporated by reference for all purposes.

FIELD OF THE INVENTION

The present invention relates to the field of image processing and methodologies to extract, represent and match silhouette image contour features.

BACKGROUND OF THE INVENTION

It is known that there are methods and models to identify an object (or equivalently a "target") on a still image or a video frame. Such methods are used for example in infrared search and track (IRST) systems in which there is a sensor acquiring an infrared image of the scene under consideration and generally these images are converted into a greyscale format. This image consists of a two dimensional array of pixels which represent the infrared intensity at various locations. Currently there are systems and methods to extract and match features of the outlines of the input objects. These systems are used for example to determine a target of a known type and it will then be possible to interpret it accordingly. In such a method, it is desirable to represent different outlines efficiently to be able to store them in less space and speed the searching process up.

One such known method uses a curvature scale space (CSS) wherein the outline of the object which is a closed curve is used to generate the CSS. For this purpose, another initial calculation to fit a curve on the contour of the object is generally applied on a binary silhouette image of the object under consideration. In this known method, circle of curvature values are calculated over the closed curve and object descriptors are derived from a scale space representation of the outline. These are represented by graphs and peak values on this graph are used as feature parameters. Using such a representation, various shapes on images can be identified, matched or aligned. One of the main problems with the CSS method is that, it relies on the starting point of calculations on the silhouette curve. Since the silhouette is a closed curve around the object on an image, it does not have a defined starting point and this constitutes a problem when it is required to match or recognize outlines. As a solution to this problem, the peak values are currently being used for matching shapes, which is sensitive to noise and incorrect segmentation of outlines. When the outline is extracted with slight errors, the results may vary significantly with such an approach.

Another currently used method implements an ordering among the peaks on the graph acquired by the CSS technique. For example, peak coordinates are ordered with respect to the peak heights in a current implementation. Yet another technique is using the maximum peak as the starting point and representing the outlines starting from that peak. Again, these methods are prone to noise and incorrect segmentation or incorrect curve fitting.

The well known scale invariant feature transform (SIFT) method on the other hand, uses a scale space representation of a two dimensional (2D) greyscale image and generally the representative features of objects on the pixel image are found by computing difference of Gaussian images forming the scale space. Using this two dimensional method, various objects on pixel images can be represented by a list of salient points, can be compared, identified or matched. Disadvantages of the CSS outline feature extraction methods and the inability of the SIFT methods to find feature points representing only the outline of an object necessitate a new method. In some applications such as infrared imaging systems, targets or objects on the image generally have its features on its outline. Furthermore some objects do not require a complete representation but can be identified by only its outline. Storing feature points only on the outline takes less space and searching and matching will be much faster.

The current methods are not offering a reliable and efficient way of extracting, representing and matching silhouette image contour features on their own and a new methodology is introduced in this document.

The British patent document GB2393012, an application in the state of the art, discloses a method for searching a two-dimensional outline and comprises inputting a query, deriving a descriptor of said outline from a curvature scale space representation of the outline of the object, wherein the peak co-ordinate values of the CSS representation are ordered on the basis of the peak height values.

The U.S. Pat. No. 7,430,303, an application in the state of the art, discloses a method for extracting and matching gesture features of image wherein a closed curve formed by a binary contour image of the gesture image is used to form curvature scale space (CSS) image and feature parameters are determined by extracting first plural peaks.

The U.S. Pat. No. 6,711,293, an application in the state of the art, discloses a method and apparatus for identifying scale invariant features in an image by producing a plurality of difference images, blurring an initial image to produce a blurred image and subtracting the blurred image from the initial image to produce the difference image.

SUMMARY OF THE INVENTION

An objective of the present invention is to provide a methodology for extracting, representing and matching silhouette image contour features reliably and efficiently independent of scale and resolution of the silhouette image.

Another objective of the present invention is to provide a methodology for extracting, representing and matching silhouette image contour features reliably independent of orientation.

DETAILED DESCRIPTION OF THE INVENTION

A system and method realized to fulfil the objective of the present invention is illustrated in the accompanying figures, in which.

The components illustrated in the figures are individually numbered where the numbers refer to the following:
1. System for identifying scale invariant features of image outlines
2. Feature and image database
3. Processing unit
C. Center point
D. Dot
F. First octave
L. Scale level direction
S. Second octave
R. Curve parameter direction
100. Method for identifying scale invariant features of image outlines A method for detecting a target in maritime applications (100) fundamentally comprises the following steps,
- receiving a parametric equation of a closed planar curve (101),
- choosing nodes on the closed planar curve with equal intervals (102),
- generating a continuous scale space of the nodes on the curve by successively convolving the planar curve with a Gaussian filter and down-sampling it after each octave (103),
- calculating a value representing the degree of bending or amount of curvature at that point for every node on the closed curve for every scale in every octave (104),
- finding curvature differences between plurality of adjacent scales and forming curvature difference groups (105),
- comparing each curvature difference value with curvature differences belonging to the same and adjacent groups; and choosing the nodes with a minimum or maximum curvature difference as feature points (106),
- representing the outline with a descriptor including all the feature points and their respective parameters (107), First, a parametric equation of a closed planar curve is received which represents the outline of the shape which will be matched, identified, or represented with a descriptor is received in step (101). In the case of an infrared search and track (IRST) system, raw input data will be a two dimensional grey scale pixel image, each pixel representing the infrared density for that location in the scene under consideration. To be able to find the outline of an object (or equivalently a target) on an image, a simple approach is representing it as a binary image by pre-processing it using a cutout filter. There are known methods and algorithms to generate a binary image, in which the object is represented only by its shadow or silhouette (a black area on a white background) and these are easy to apply on infrared grayscale images. These real world problems usually provide signals in discrete form, such as a binary silhouette pixel image. When it is required to represent its features independent of scale and resolution, a continuous representation is needed and if a continuous representation is required, the silhouette must be fitted to a curve model, like a spline or polynomial.

Although this operation is trivial, the choice of the fitting method and related parameters are crucial. In a preferred configuration of the present inventive method, chain coding, a representation of neighbouring pixels on an image outline, [Freeman Chain code 1961] is used to fit silhouettes in binary images into closed B-splines. The chain codes denote the actual distance between two pixels (1 or $\sqrt{2}$ units), and these distances are used when fitting a k-order B-spline to the given silhouette, finding its outline. A continuous representation of the silhouette is necessarily required because using a uniformly sampled set of points of the closed curve enables us to construct a uniform scale-space of the signal.

The pixels belonging to the input silhouette is not uniformly sampled over the curve and number of pixels is arbitrary and this requires preferably constant number of points sampled on the fitted spline curve and one may obtain a uniformly sampled point set of any number of points from a spline function which is done in a step (102). The curve which represents the outline of the shape is a closed planar curve meaning that it starts and ends at the same point forming a loop around the silhouette under consideration and represents points on the same plane. In step (102) the curve is divided into equal sections with "nodes" or sample points at each division position. The number of divisions may depend on the resolution of the initial image (silhouette image) since overdoing the division for a low resolution image will not improve results but increase the complexity. The closed parametric spline function will give the position along the respective outline given a parameter (which is a real number between 0 and 1 intuitively) and every node will have a value with respect to this parameter.

Detecting key points or feature points on planar curves is done using a difference of Gaussians (DoG) approach which was done on 2D pixel images in the prior art. A continuous scale space of the nodes on the curve is generated in step (103). This may seem similar to the previous CSS methods but feature extraction and related intermediate steps differ greatly.

Figure 2:
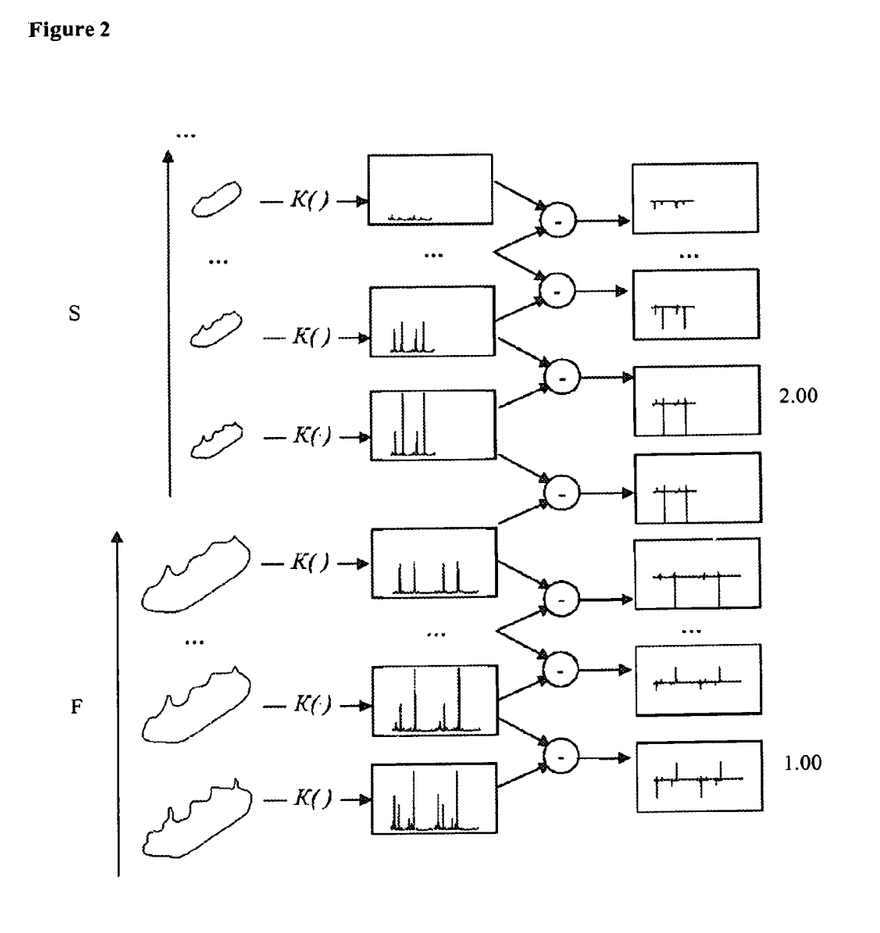
FIG. 2 is a drawing of two representative octaves, their respective scale spaces, circle of curvature graphs and difference of curvature graphs.

In a preferred configuration, the planar curve is downsampled into half generating at least one octave. In the case of a closed parametric curve, down-sampling is applied by decreasing the number of the equally separated sample points (nodes). In a preferred configuration, nodes are eliminated by skipping one node along the curve meaning that all of the odd or even nodes are discarded. Throughout each octave, a continuous scale space is generated by convolving the planar curve with a Gaussian filter in a preferred embodiment. The scale space of the curve will then be constructed, and in fact this whole scale space can be made a continuous scale space when the number of scales is adjusted so that between each octave the scale gap is preferably the same as Gaussian filtering within octaves. The Gaussian filter is applied along the planar curve and thus is a single row filter with standard deviation $\sigma$ (the curve is actually one dimensional with a determined starting point and a single parameter). Since the original curve is a closed one, a starting point must be indicated beforehand. Referring to FIG. 2, first column represents the outline for each scale, the nethermost being the original input outline. As the input outline is convolved with Gaussian filters, higher scales are obtained and the first octave (F) is generated. The second octave (S), is again generated using the initial outline which is down-sampled into half meaning that there are less nodes in the outlines of the second octave (S). Sub-scales of the second octave (S) are generated by further convolving the down-sampled outline. This scale space generation is repeated for further octaves as required using the down sampled outline of the previous octave as a starting outline for the next one. With a correct arrangement of down-sampling and filtering parameters, as mentioned above, a continuous scale space is generated.

The next step is calculating circle of curvature for every node on the closed curve for every scale in every octave (104), in which a function K (·) is used to determine circle of curvature values as a 1-D signal. K (·) is a function that outputs inverse of the radius of the circle, which is tangent to the curve at a given point (node). This. value is an example to a parameter or value representing the amount of curvature at that point. Referring to FIG. 2, second column represents the outline for each scale as a circle of curvature (vertical axis)

versus curve parameter (horizontal axis) graph. Shape of this signal depends on the starting point on the closed curve and because of this, for each curves in all layers and octaves, the same starting point is used, since its exact position in spline parameter space can be adjusted (e.g it can be selected as 0).

For each octave of the scale-space, the initial curve is repeatedly convolved with Gaussians to produce the set of scale-space curves shown on left. (FIG. 2) After each octave, the curve is down-sampled into half, and the process is repeated. Then using the curvature function K (·), curvature values over these curves are calculated for each level at each octave (middle column on FIG. 2). By this way, the scale-space of the circle of curvature values (or any other amount representing the degree of curvature) is obtained.

Then the final scale-space, from which the local extrema will be extracted, is constructed by calculating the difference of curvature value levels in step (105). This difference, which is found by subtracting adjacent circle of curvature graphs, is used to form a second set of graphs as seen on the third column of FIG. 2. Each difference data set (or graph) obtained from two scales is called a group in this context. The continuous scale space implies that the scale levels are still accepted adjacent levels between octaves. The mathematical transformation in between octaves, wherein the resolution of the outline is changing, is trivial.

In the next step, each curvature difference value is compared with curvature differences belonging to the same and adjacent difference groups (106). In a preferred embodiment, only the two neighbors on the current difference group and three closest (curve parameter-wise) nodes on the adjacent groups are used for comparison and the nodes with a minimum or maximum curvature difference are chosen as feature points. Among these feature or key points, the nodes which are closer to each other than a predetermined threshold are eliminated in a further step (108) in a preferred configuration. The distance between nodes to determine whether they will be eliminated or not is the distance along the curve and not the real two dimensional distance. Features that are close to each other than a threshold will not be used in the final feature list. This threshold, is selected as 1% of the entire silhouette curve length in a preferred configuration.

The detected key points have a one dimensional curve parameter indicating the position of the node along the curve, a scale value representing the scale level of the feature node, and a vector representing the orientation of the feature node with respect to a predetermined coordinate system. The curve parameter is between 0 and 1 in a preferred configuration. The scale value represents which difference group a feature belongs to. In a preferred configuration, the difference group which is found by subtracting first two scales in the first octave is given a scale value of 1.00 and the difference group which is found using the first two scales of the second octave is given a scale value of 2.00 and etc. (Shown next to difference graphs on FIG. 2) Other difference groups in between these scales are given real numbers interpolated between them. For example if there are four scales and three difference groups per octave, then the difference group belonging to the second and third levels is given the value 1.25 and the difference group of the second octave's first scale and first octave's last scale is given the value 1.75. The orientation of a keypoint is the direction of the unit vector, which is normal to the tangent line of the scaled curve at that point in a preferred configuration. By the scaled curve we mean the smoothed curve residing within the Gaussian scale-space at the level which corresponds to the scale value of the keypoint, not the original curve itself. Any two dimensional direction vector representing the slope of a keypoint on a scaled curve can be used as an orientation vector.

Using a descriptor around the key point, recognition tasks can be carried out with a bag-of-features based method. However when the texture of the image is low in detail, (e.g. a infrared (IR) image of a ship from a distance) descriptors provide little use. That's why silhouettes are usually preferred in these cases. Using such descriptors including three parameters, and extracting feature sets belonging to the outline following steps (101) to (107), it is possible to generate a database including various outlines belonging to different shapes and it is possible to compare or match them. Furthermore, when a closed parametric outline curve is received, it is possible to compare its descriptor with all the descriptors in the database and determine what shape that outline belongs to. In a further step (109), a descriptor is compared with each previously recorded descriptor belonging to various outlines and at least one descriptor with a good match is found.

Figure 3:
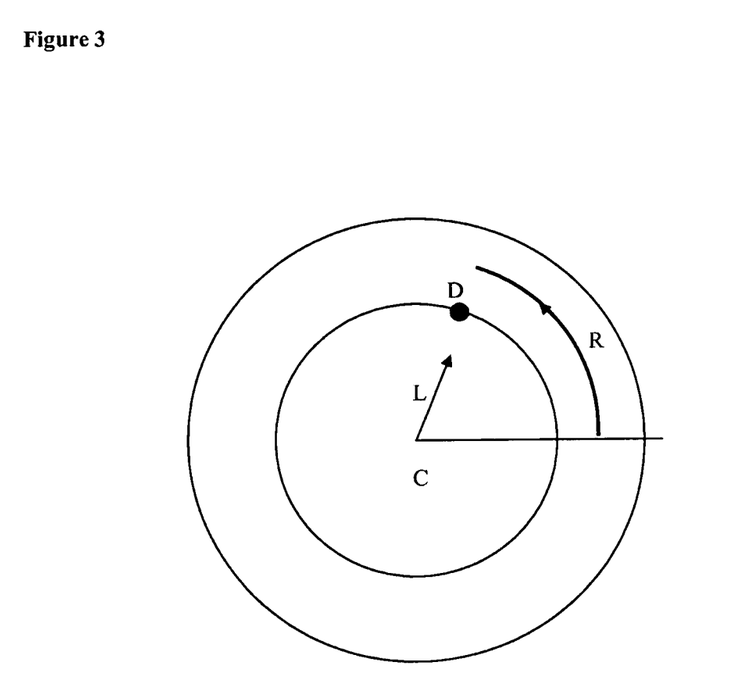
FIG. 3 is a schematic descriptor extracted for a single point according to the present invention.
Figure 4:
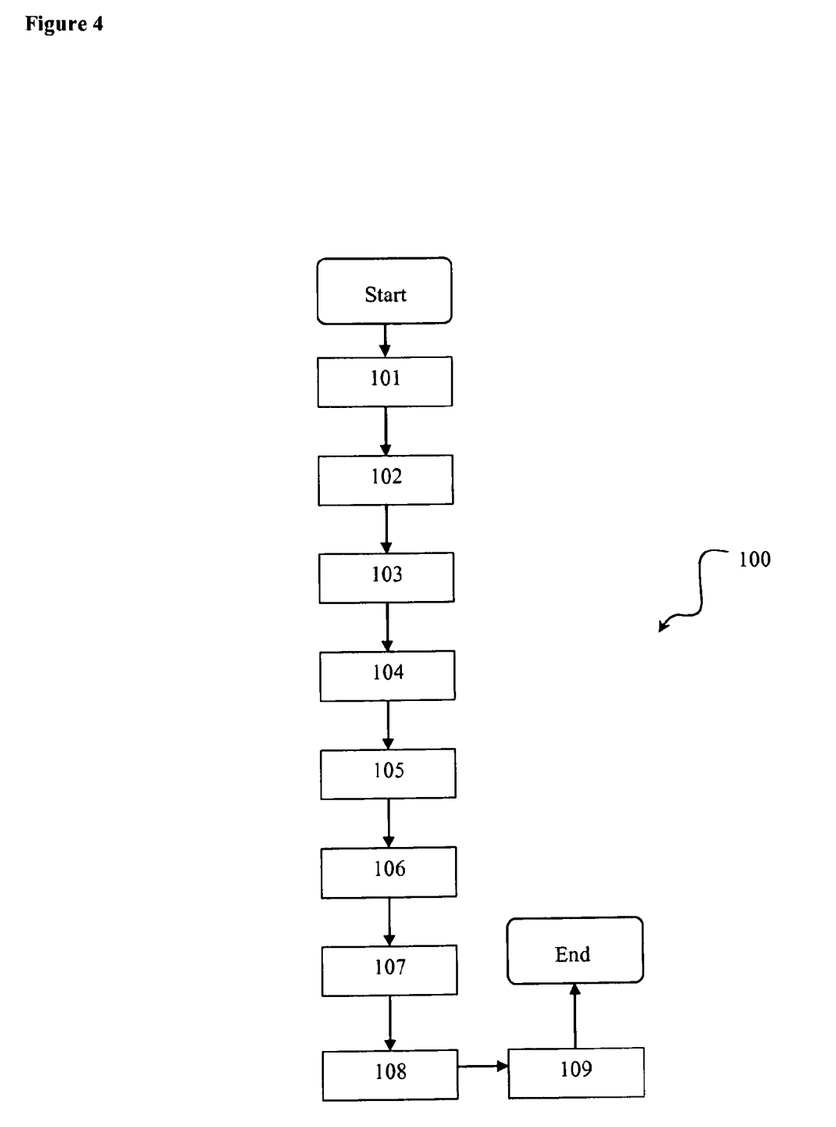
FIG. 4 is the flowchart of the preferred method of the present invention.

Depending on the curve fitting scheme, the starting point of the curve may differ, thus the method becomes variant under rotation of the silhouette. However this dependency is handled by a special representation. In step (107) a two dimensional (2D) image is generated as a descriptor using all the position, scale and orientation values of all extracted key points. In this (2D) image the center point (C) represents the highest available scale value of the key points and scale values decrease radially as one moves towards the exterior in the direction (L). All extracted key points corresponds to a radial region on the descriptor image. Starting from a radial line, a rotation around the center point (C), in the direction (R) represents the curve parameter, starting and ending at the same place, and feature points are placed as a dot (D) at a place matching their scale value and curve parameter. Additionally, the two dimensional vectors representing the feature's orientations are encoded with the color of the placed dot (D) in a preferred configuration. Moreover if the colors are chosen such that the hue changes with the rotation of the feature node along a continuous color wheel, the comparison in step (109) is further simplified as will be discussed below. For example when 0° and 360° is represented by red, 120° is pure green and 240° is pure blue and the regions in between are linearly interpolated a continuous color wheel is obtained. Here, values representing the orientation vector do not have to be colors and any value can be used to generate a two dimensional array as long as values are repeating from the beginning after reaching the maximum value (360° for our example). Colors are used to make the descriptors human-readable and this also makes the descriptors be encoded as usual colored red, green, blue (RGB) image files. (FIG. 3)

In step (109), when comparing two descriptors with all the feature parameters encoded as images of the same size, they are laid over each other matching the centers (highest scale number point) of the images and the orientation components are subtracted. This comparison is done for every possible rotation of each image on the other which will give possible positions of the feature points along the outline. Moreover, the orientation values of one array are also changed for every possible value with the same amount at each location and different feature point orientations are also considered. In the case of a color image, the colors of one image is changed according to the chosen color wheel which will give possible orientations of feature points, without altering their relative orientations since all values on the image are incremented or decremented the same amount. The pairs giving the least difference upon comparison will give the best match of the outline. Considering that the resolution required to generate such images is low, the matching process is fast enough to identify an outline in a large database.

It can be said that the descriptors are represented as radial arrays in which radial distance from the center represent the scale value of the extracted key point, rotation around this center represents the outline curve parameter and the value at each point represent the feature orientation in step (107). Descriptor pairs are compared at every possible rotation around the same center using every possible relative feature orientation value, which is changed in a scheme in which orientation value represents the same feature orientation at two different values and incremented or decremented the same amount throughout one radial array and repeats upon reaching the highest or lowest value. This ensures that the relative orientations of features remain the same with a cycling value. In a preferred configuration, the radial array is encoded on a two dimensional color image.

Anyone who is proficient in the previous art should understand that using this method (100), descriptor of an outline, whose parametric equation is known, can be extracted to be compared with a list of descriptors invariant of scale and orientation. The input outline then can be identified or matched or a given outline can be searched in a database of descriptors representing different outlines of different objects using the method (100). Again, this database can be generated using some of the steps of method (100), namely steps (101) to (108). (FIG. 3)

A system for identifying scale invariant features of image outlines (1) fundamentally comprises;
- at least one feature and image database (2) configured to store outline descriptors and respective outlines together with original pixel images,
- at least one processing unit (3) connected to feature and image database (1) and configured to receive a parametric equation of an outline and implement the method for identifying scale invariant features of image outlines (100) using this curve as the input.

Figure 1:
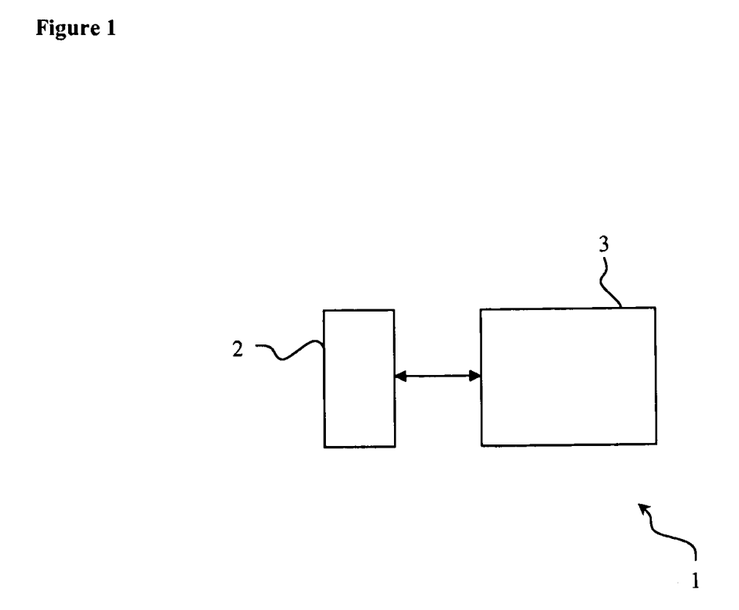
FIG. 1 is the schematic view of the preferred embodiment system.

In a preferred embodiment of the present invention, processing unit (3) is configured to receive at least one parametric equation of a planar outline. Anyone proficient in the image processing field should understand that this system (1) and method (100) is applied on a sequence of pixel images and objects with outlines can be continuously monitored. In another embodiment of the present inventive system (1), processing unit (3) is configured to receive at least one image from a recorded or live video stream frame and have means to pre-process a two dimensional pixel image to acquire a planar closed parametric outline. Therefore, processing unit (3) is configured to be connectible to a camera, which is preferentially an infrared vision camera. (FIG. 1)

Upon reception of an outline, processing unit (3) is either use it to extract a descriptor as described above according to steps (101) to (107) and it is configured to store this outline, its descriptor and original image (if exists) in the feature and image database (2). When the further step (109) is executed, using the data in the feature and image database (2), the system (1) is able to compare the input outline with all the recorded outlines and find at least one result with a good match. As it is well-known in the previous art, the results can be output to any interface device showing the identified outline and/or image. This system (1) is applicable to any device which is intended to indentify objects or shapes on 2D images using their outline features. The interface device can be any of a monitor, display or printer or the results are used as the input of any other processing system.

In conclusion, a reliable and efficient methodology to extract, represent and match silhouette image contour features independent of orientation, scale and resolution is obtained with this inventive system (1) and method (100).

Within the scope of these basic concepts, it is possible to develop a wide variety of embodiments of the inventive "system and method for identifying scale invariant features of image outlines" (1), (100). The invention cannot be limited to the examples described herein; it is essentially according to the claims.

The invention claimed is:

1. A method for identifying scale invariant features of image outlines (100) characterized by the steps of;
   - receiving a parametric equation of a closed planar curve (101),
   - choosing nodes on the closed planar curve with equal intervals (102),
   - generating a continuous scale space of the nodes on the curve by successively convolving the planar curve with a Gaussian filter and down-sampling it after each octave (103),
   - calculating a value representing the amount of curvature for every node on the closed curve for every scale in every octave (104),
   - finding curvature differences between plurality of adjacent scales and forming curvature difference groups (105),
   - comparing each curvature difference value with curvature differences belonging to the same and adjacent groups; and choosing the nodes with a minimum or maximum curvature difference as feature points (106),
   - representing the outline with a descriptor having a center representing a highest available scale value of key points as radial arrays in which radial distance from the center represents a scale value of difference groups, rotation around this center represents the outline curve parameter and the value at each point represents the feature orientation and the radial array is encoded on a two dimensional color image and two dimensional vectors representing the feature's orientations are encoded with the color of the placed point (107).

2. The method for identifying scale invariant features of image outlines (100) according to claim 1, characterized in that an image pre-processing operation, which generates a binary image from an input image and fits a curve on the boundary of an object is implemented before step (101).

3. The method for identifying scale invariant features of image outlines (100) according to claim 2, characterized in that the planar curve is down-sampled into half in step (103).

4. The method for identifying scale invariant features of image outlines (100) according to claim 2, characterized in that a continuous scale space is generated by convolving the planar curve with a Gaussian filter throughout each octave in step (103).

5. The method for identifying scale invariant features of image outlines (100) according to claim 2, characterized in that a function that outputs inverse of the radius of the circle, which is tangent to the curve at a given node is used to calculate curvature in step (104).

6. The method for identifying scale invariant features of image outlines (100) according to claim 2, characterized in that two neighbours on the current difference group and three closest nodes on the adjacent groups are used for comparison in step (106).

7. The method for identifying scale invariant features of image outlines (100) according to claim 1, characterized in that the planar curve is down-sampled into half in step (103).

8. The method for identifying scale invariant features of image outlines (100) according to claim 7, characterized in that a continuous scale space is generated by convolving the planar curve with a Gaussian filter throughout each octave in step (103).

9. The method for identifying scale invariant features of image outlines (100) according to claim 7, characterized in that a function that outputs inverse of the radius of the circle, which is tangent to the curve at a given node is used to calculate curvature in step (104).

10. The method for identifying scale invariant features of image outlines (100) according to claim 1, characterized in that a continuous scale space is generated by convolving the planar curve with a Gaussian filter throughout each octave in step (103).

11. The method for identifying scale invariant features of claim outlines (100) according to claim 10, characterized in that a function that outputs inverse of the radius of the circle, which is tangent to the curve at a given node is used to calculate curvature in step (104).

12. The method for identifying scale invariant features of image outlines (100) according to claim 1, characterized in that a function that outputs inverse of the radius of the circle, which is tangent to the curve at a given node is used to calculate curvature in step (104).

13. The method for identifying scale invariant features of image outlines (100) according to claim 1, characterized in that two neighbours on the current difference group and three closest nodes on the adjacent groups are used for comparison in step (106).

14. The method for identifying scale invariant features of image outlines (100) according to claim 1, characterized by the step of eliminating the feature points which are closer to each other than a predetermined threshold along the outline (108).

15. The method for identifying scale invariant features of image outlines (100) according to claim 14, characterized in that the threshold is selected as predetermined percent of the entire silhouette outline length in step (108).

16. The method for identifying scale invariant features of image outlines (100) according to claim 1, characterized by the step of comparing a descriptor with each previously recorded descriptor belonging to various outlines and finding at least one descriptor with a good match (109).

17. The method for identifying scale invariant features of image outlines (100) according to claim 1, characterized in that descriptor pairs are compared by finding the difference at every possible rotation of radial arrays around the same center in step (109).

18. The method for identifying scale invariant features of image outlines (100) according to claim 17, characterized in that one of the descriptors' orientation values are cyclically varied for at least one relative rotation of radial arrays in step (109).

19. The method for identifying scale invariant features of image outlines (100) according to claim 1, characterized in that pairs giving the least difference upon comparison will give the best match in step (109).

20. A system for identifying scale invariant features of image outlines (1) characterized by;
at least one feature and image database (2) configured to store outline descriptors determined by steps (101) to (108) as claimed in any of the preceding claims and respective outlines together with original pixel images,
at least one processing unit (3) connected to feature and image database (1) and configured to receive a parametric equation of an outline and implement the method for identifying scale invariant features of image outlines (100) as claimed in claim 1, using this outline as the input.

* * * * *